United States Patent

Chen et al.

[11] Patent Number: 5,112,895
[45] Date of Patent: May 12, 1992

[54] WEATHERABLE GRAFT POLYMERS HAVING IMPROVED IMPACT RETENTION AND IMPROVED MELT FLOW

[75] Inventors: Chuan J. Chen, Amherst; Fred M. Peng, Longmeadow, both of Mass.

[73] Assignee: Monsanto Company, St. Louis, Mo.

[21] Appl. No.: 704,169

[22] Filed: May 22, 1991

Related U.S. Application Data

[63] Continuation-in-part of Ser. No. 468,668, Jan. 23, 1990, abandoned.

[51] Int. Cl.$^5$ .............................................. C08K 5/11
[52] U.S. Cl. .................................... 524/308; 524/314; 525/222
[58] Field of Search ................................ 524/314, 308

[56] References Cited

U.S. PATENT DOCUMENTS 4,656,213  4/1987  Schlademan .................. 524/272
4,877,826  10/1989  Beyer .............................. 524/377

*Primary Examiner*—John C. Bleutge
*Assistant Examiner*—Mark Sweet
*Attorney, Agent, or Firm*—William J. Farrington; Richard H. Shear

[57] ABSTRACT

Weatherable thermoplastic polymeric compositions are formed by blending weatherable grafted rubber composition with an aliphatic diester selected from the group consisting of dialkoxyalkoxyalkyl diesters and dialkoxydialkoxyalkyl diesters of aliphatic dicarboxylic acids containing 4 to 8 carbon atoms.

6 Claims, No Drawings

WEATHERABLE GRAFT POLYMERS HAVING IMPROVED IMPACT RETENTION AND IMPROVED MELT FLOW

This application is a continuation-in-part of patent application Ser. No. 07/468,668 filed Jan. 23, 1990, now abandoned.

BACKGROUND OF THE INVENTION

This invention relates to thermoplastic graft polymers with improved weatherability and processability.

Weatherability, as used in describing this invention, refers to the ability of the graft polymer to retain desirable physical properties such as impact strength, on exposure to environmental conditions such as high temperature, ultraviolet light, high humidity, rain and other elements generally included in discussions of weatherability.

Weatherable graft polymers, which are described in U.S. Pat. Nos. 4,585,832, 4,766,175 and 4,877,826, use acrylate and EPDM rubbers over butadiene type rubbers which tend to break down in the presence of sunlight. The weatherable polymers are prepared by graft polymerizing a vinyl aromatic monomer such as styrene, an ethylenically unsaturated monomer such as acrylonitrile and optionally additional monomers such as methyl methacrylate and the like onto an acrylate rubber or an ethylene-propylene-diene rubber (EPDM). The graft copolymers are blended with a rigid polymer such as a styrene acrylonitrile copolymer to form weatherable graft polymer compositions.

It is an object of this invention to provide a weatherable graft polymer composition having improved processability and weather resistance.

SUMMARY OF THE INVENTION

The present invention is directed to weatherable graft polymer compositions comprising:

(A) a graft polymer component comprising a rubber substrate selected from the group consisting of acrylate rubbers and EPDM rubbers wherein the rubber substrate is grafted with a copolymer of a vinyl aromatic monomer and at least one copolymerizable monomer;

(B) a rigid copolymer component which is a copolymer of a vinyl aromatic monomer and at least one copolymerizable monomer; and (C) an additive comprising: (i) 0.5-10 parts per hundred parts by weight of the graft polymer composition of one or more aliphatic diesters selected from the group consisting of dialkoxyalkoxyalkyl diesters and dialkoxydialkoxyalky diesters of aliphatic dicarboxylic acids containing 4 to 8 carbon atoms; and (ii) 0-2 parts per hundred parts by weight of the graft polymer composition of a silicone fluid.

DESCRIPTION OF THE INVENTION

The diester used in the present invention is selected from the group consisting of dialkoxyalkoxyalkyl diesters and dialkoxydialkoxyalkyl diesters of aliphatic dicarboxylic acids containing 4 to 8 carbon atoms wherein each alkoxy group contains 1 to 6 carbon atoms and preferably contains 2 to 4 carbon atoms and each alkyl group contains 1 to 6 carbon atoms and preferably contains 2 to 4 carbon atoms.

The preferred diesters include dibutoxyethoxyethyl adipate and a mixture of 30 mole % dibutoxydiethoxyethyl adipate and 70 mole % of dibutoxydiethoxyethyl glutarate. These diesters are available as TP-95 and TP-759, respectively from Morton Thiokol, Inc. The amount of diester used is from 0.5 to 10 parts and preferably from 1.0 to 5.0 parts per hundred parts of the weatherable graft polymer composition.

The silicone fluid used in the present invention is a liquid condensation polymer of silane diols of the general formula $RR'Si(OH)_2$, where R is an alkyl group of 1-8 carbons and R' is hydrogen, an alkyl group of 1 to 8 carbons, a vinyl group, a phenyl group, a nitrile group, an epoxy group and the like. Preferably the silicone fluid has a viscosity ranging from 0.65 centistoke at 77° F. to 1,000,000 or more centistokes at 77° F.

The preferred group of silicone fluids include dimethyl silicone, a liquid condensation polymer of dimethyl silane diol, and methyl hydrogen polysiloxane, a liquid condensation polymer of methyl hydrogen silane diol, $(CH_3)(H)Si(OH)_2$. Dimethyl silicones and methyl hydrogen polysiloxane are marketed by Dow Corning Corporation under the designation Dow Corning Fluids and by General Electric Co. under the designation SF-69 and SF-99. The amount of silicone fluid used is from zero (0) to 2 parts and preferably from 0.05 to 1 part per hundred parts by weight of the weatherable graft polymer composition.

The weatherable graft polymer compositions of the present invention are: (A) a grafted rubber component comprising a rubber substrate, and grafted thereto, a rigid polymer superstrate; and (B) a rigid copolymer component.

The rubber substrate is selected from the group consisting of acrylate rubbers containing 2 to 8 carbon atoms and ethylene-propylene-diene rubber (EPDM), and mixtures thereof. Optionally a minor amount of a conjugated diene rubber or mixtures of such rubbers selected from the group consisting of conjugated 1,3-dienes may be used in combination with the acrylate and/or EPDM rubber component.

Preferred acrylate rubbers are crosslinked homopolymers of $C_{2-8}$ alkyl acrylates, especially butyl acrylate or 2-ethylhexyl acrylate and copolymers of the foregoing acrylates with styrene, acrylonitrile or methyl methacrylate, having a glass transition temperature, Tg, preferably less than 0° C.

The acrylate rubber can be prepared by various processes including the emulsion process described in U.S. Pat. No. 4,766,175. The emulsion rubber particles can be grown to various sizes by known seeding or agglomeration procedures. In a preferred embodiment the acrylate rubber has a weight average particle size diameter, Dw, between about 0.08 and 0.4 microns. Weight average particle size diameter, Dw, is the diameter calculated from the intensity weighted average diffusion coefficient measured by photon correlation spectrophotometry at a 90° scattering angle (e.g. Brookhaven Instruments Corp. BI-90 particle sizer).

Grafting of acrylate rubbers is well known and disclosed in U.S. Pat. No. 3,830,878; 4,341,883; 3,944,631; 3,691,260, and 4,224,429.

EPDM (ethylene-propylene-diene-monomer) type rubbers are well known in the art and are made from alpha-monoolefins having the formula $CH_2=CHR$, in which R may be a hydrogen atom or a saturated alkyl group, such as methyl, ethyl, n-propyl, isopropy, etc. Preferred rubbery copolymers are those in which the alpha-monoolefins used are ethylene and propylene, the weight ratio of ethylene monomer units to propylene monomer unit in the copolymer being from 20/80 to 80/20, preferably between 35/65 and 65/35. The diene monomer component of the rubbery copolymer comprises straight-chain or cyclic diene hydrocarbons which are copolymerizable with the alpha-monoolefins. The preferred diene monomers are 5-vinyl-2-norbornene, 5-ethylidene-2-norbornene, dicyclopentadiene and 1,4-hexadiene.

The concentration of the diene monomer component may range from about 1 to about 20 weight % of the copolymer rubber.

Methods for preparing EPDM graft copolymers are disclosed in U.S. Pat. Nos. 3,489,822; 3,642,950; 3,819,765; and 3,849,518 which are incorporated herein by reference.

In a preferred embodiment the EPDM rubber used has a weight average particle size diameter, Dw, between about 0.3 and 6.5 microns.

Conjugated diene rubbers or mixtures of such rubbers which are suitable for use in the present invention in combination with the acrylate and EPDM as an additional grafted rubber component are formed by the polymerization of one or more conjugated, 1,3-dienes, e.g., butadiene, isoprene, 2-chloro-1,3-butadiene, 1-chloro-1,3-butadiene, piperylene, etc. The diene rubber or mixture of such rubbers should have a second order transition temperature (Tg) not higher than 0° C., preferably not higher than 31° C., as determined by ASTM Test D 746-52T. The butadiene homopolymer and rubbery copolymers of butadiene and a polymerizable comonomer such as styrene, acrylonitrile, methylmethacrylate and the like are preferred.

In a preferred embodiment, the diene rubber has a weight average particle size diameter, Dw, between about 0.3 and 6.5 microns including bimodal and trimodal distributions of different particle sizes.

The superstrate grafted onto the rubber substrate is a copolymer of a vinyl aromatic monomer and one or more copolymerizable ethylenically unsaturated monomers. Exemplary of the vinyl-aromatic monomers which may be used in the superstrate are styrene, alpha-methylstyrene, alpha-ethylstyrene, vinyltoluene, p-ethylstyrene, 2,4-dimethylstyrene, chlorostyrene, vinyl naphthalene, vinyl anthracene and the like. If so desired, mixtures of such vinyl-aromatic monomers, especially styrene and alpha methyl styrene, may be employed.

Exemplary of the ethylenically unsaturated comonomers which may be used in the superstrate are acrylonitrile, methacrylonitrile, ethacrylonitrile, methyl methacrylate, maleic anhydride, maleic anhydride esters and imdes thereof such as N-phenyl maleimide. Mixtures of such monomers are also contemplated.

A portion of the monomers polymerized in the presence of the rubber substrate will not be grafted to the rubber but will be present as ungrafted copolymer. The amount of ungrafted copolymer may be increased or decreased depending upon the weight ratio of monomers to rubber, the particular monomer formulation, the nature of the rubber, and the conditions of polymerization.

The rigid copolymer component is prepared from the same types of monomers used to prepare the superstrate which is grafted onto the rubber. Preferably the rigid or matrix copolymer is compatible with the grafted rubber component. Preferred matrix copolymers are prepared from styrene and/or alpha methyl styrene and one or more monomers such as acrylonitrile, methacrylonitrile, methyl methacrylate, maleic anhydride, maleimide such as N-phenyl maleimide, and the like.

Especially preferred matrix copolymers are styrene (meth)acrylonitrile copolymers containing 30 to 90% by weight of the styrenic monomer and 70 to 10% by weight of the (meth)acrylonitrile monomer; styrene methyl methacrylate maleic anhydride or maleimide copolymers containing 45 to 83% by weight of the styrene monomer, 20 to 2% by weight of the methyl methacrylate monomer and 35 to 15% by weight of the maleic anhydride and/or N-phenyl maleimide and styrene methyl methacrylate acrylonitrile copolymers.

The weatherable graft polymer compositions contain from 5 to 40% by weight of rubber (calculated as ungrafted rubber) based on the total weight of the composition and from 95 to 60% by weight of rigid copolymer based on the total weight of the composition. More preferably the amount of rubber is from 10 to 35% by weight and the amount of rigid copolymer is from 90 to 65% by weight.

The major amount of the rubber component (ungrafted basis) should be an acrylate and/or EPDM rubber with any diene rubber, e.g. polybutadiene being a minor component, i.e. less than 50% by weight of the total rubber (ungrafted basis) in order to obtain good weatherability. Preferably any diene rubber will be less than 30% by weight and more preferably less than 20% by weight of the total rubber present (ungrafted basis).

The composition of the rigid grafted copolymer and the rigid copolymer matrix may be varied widely to obtain various properties. For example, it is well known that alpha methyl styrene, maleic anhydride and imides thereof such as N-phenyl maleimide contributed to rigidity and heat resistance while the nitrile monomers contribute to chemical resistance.

SPECIFIC EMBODIMENTS

Having described the invention, the following examples are provided as further illustrations of the present invention and are not to be construed as Limiting.

BA-SAN: The butylacrylate rubber grafted with styrene and acrylonitrile (BA-SAN) is prepared by polymerizing butyl acrylate to form a polybutylacrylate rubber using conventional emulsion polymerization. The rubber is crosslinked during polymerization such that the swelling index of the rubber in methyl ethyl ketone at 25° C. is about 10. The rubber is grafted by polymerizing a 70/30 weight ratio of styrene and acrylonitrile (120 parts total) in the presence of 100 parts of the rubber. The resulting grafted rubber has a weight average particle size diameter (Dw) of about 0.2 microns with a range of from about 0.08 to about 0.4 microns. The grafted rubber contains about 45% by weight of butyl acrylate and about 55% by weight of styrene acrylonitrile copolymer (SAN) present as grafted polymer and as free ungrafted copolymer formed during the graft polymerization procedure.

EPDM-SAN: ethylene propylene diene monomer (EPDM) rubber (100 parts by weight) is grafted with 100 parts by weight of styrene and acrylonitrile (72/28 weight ratio) using solution polymerization techniques to provide a grafted rubber having a weight average particle size diameter (Dw) of about 0.5 microns with a range of from about 0.3 to 6.5 microns. The graft level is about 50 parts per 100 parts by weight of rubber with the remaining SAN polymer formed being present as occlusions or free ungrafted copolymer.

ABS: butadiene rubber (Diene 55 from Firestone) is grafted with styrene and acrylonitrile monomer using an S/AN weight ratio of 70/30 and conventional mass suspension polymerization methods. The resulting ABS contains about 160 parts by weight of SAN grafted onto 100 parts by weight of polybutadiene. The weight average particle size diameter of the grafted rubber is about 0.8 micron with a particle size range of from about 0.3 to about 6.5 microns.

SAN I: styrene/acrylonitrile copolymer (SAN) containing 68/32% by weight of S/AN.

SAN II: styrene/acrylonitrile copolymer (SAN) containing 77/23% by weight of S/AN.

TP-95: dibutoxyethoxyethyl adipate purchased from Morton Thiokol, Inc. under the tradename "TP-95 Plasticizer".

TP-759: a mixture of 30 mole % dibutoxydiethoxyethyl adipate and 70 mole % dibutoxydiethoxyethyl glutarate purchased from Morton Thioko, Inc. under the tradename "TP-759 Plasticizer".

Loxiol G-70: a polymeric complex ester of saturated fatty acids available from Henkel Corporation.

Silicone: dimethyl silicone available from Dow Corning Corporation under the designation Dow Corning No. 200 Fluids.

SAMPLE PREPARATION

In the following examples the grafted rubber components, the SAN copolymers and the additives specified in each example are melt compounded using a Banbury Mixer followed by pelletizing. The resulting pellets are then molded and tested as indicated below. The following polyblends are used in the examples.

| Components | % by weight |
|---|---|
| POLYBLEND A | |
| grafted butyl acrylate (BA-SAN) | 33.3 |
| grafted EPDM (EDPM-SAN) | 20.0 |
| SAN I | 46.7 |
| | 100.0 Total |
| POLYBLEND B | |
| grafted butyl acrylate (BA) | 38.9 |
| grafted EPDM (EPDM-SAN) | 15.0 |
| SAN I | 46.1 |
| | 100.0 Total |
| POLYBLEND C | |
| grafted butyl acrylate (BA-SAN) | 38.9 |
| grafted EPDM (EPDM-SAN) | 15.0 |
| SAN II | 46.1 |
| | 100.0 Total |
| POLYBLEND D | |
| grafted butyl acrylate (BA-SAN) | 44.0 |
| grafted butadiene (ABS) | 20.0 |
| SAN I | 36.0 |
| | 100.0 Total |

The total rubber content (ungrafted basis) in Polyblends A, B and C is 25% by weight while in Polyblend D it is 22.5%.

ANALYTICAL TEST PROCEDURES

1. Weatherability: Weatherability is judged by the difference in the Inverted Dart Impact (IDI) of samples exposed to accelerated weathering conditions and control samples not exposed. Exposed samples are subjected to the accelerated weathering conditions set forth either in the SAE J-1885 or ASTM D 2565-85 tests. The ASTM and SAE weatherability tests are carried out using an Atlas Ci65/DMC Weather-Ometer with a xenon-arc source. The exposure levels are expressed as $kJ/m^2$/nanometer at 340 nanometers as specified in Tables 1, 2 and 3. Results are expressed in terms of % Retention of IDI strength. The ASTM test uses a Type BH light exposure device with 6500 W quartz xenon burner at an irradiance level of $0.35W/m^2$/ nanometer at 340 nanometers, and using continuous light-on mode with intermittent water spray and dry portion at 30% relative humidity.

2. Inverted Dart Impact (IDI) - (Joules): A dart with a hemispherical head having a diameter of 0.013 meter is used, against which the specimen is driven at a constant speed of either 2.12 or 3.39 meters/second. This is in accordance with the procedure set forth in ASTM D 3763 (specimen thickness =2.54 mm, ring diameter =31.75 mm). Results are expressed in Joules.

3. Izod Impact (J/m): A falling pendulum with 163 Joules of energy at a velocity of 11.5 feet (3.5 meters) per second strikes a fixed specimen; the height of the pendulum swing after striking is a measure of the energy absorbed and thus indicates impact strength. Results are expressed in Joules/meter. This is in accordance with the procedures set forth in ASTM D 256.

4. Melt Index (g/10 minutes): The Melt Index is used as a measure of processability and is the number of grams of thermoplastic resin at 230° C. that can be forced through a 2.1 millimeter orifice in 10 minutes by a 3.8 kilogram force. This is in accordance with the procedure set forth in ASTM D 1238. Results are expressed in grams/10 minutes.

EXAMPLE 1 to 7

In these examples Polyblend A, B and C are compounded with various amounts of TP-95 or Loxiol G-70 and tested for IDI, weatherability and processability. Loxiol G-70 is a known plasticizer used in certain polymeric material to improve certain properties. It is used here for comparison purposes. The results are tabulated in Table I below.

TABLE I

| | | | SUMMARY OF EXAMPLES 1 TO 7 | | |
|---|---|---|---|---|---|
| EXAMPLE | TP-95 (pph)* | LOXIOL G-70 (pph) | IDI (Joules)** UNEXPOSED SAMPLE | WEATHERABILITY (% Retention)*** | MELT INDEX (g/10 minutes) |
| (1) Polyblend A | 0 | 0 | 26.1 | 38 at 2000 | 0.6 |
| (2) Polyblend A | 3.0 | 0 | 21.6 | 100 at 2000 | 1.0 |
| (3) Polyblend A | 0 | 3.0 | 21.4 | 54 at 2000 | 0.8 |
| (4) Polyblend B | 0 | 0 | 26.3 | 33 at 1500 | 0.4 |
| (5) Polyblend B | 3.0 | 0 | 22.5 | 99 at 1500 | 0.7 |
| (6) Polyblend C | 0 | 0 | 25.2 | 19 at 1500 | 0.4 |
| (7) Polyblend C | 2.0 | 0 | 26.1 | 63 at 1500 | 1.0 |

*pph = parts per hundred parts of Polyblend.
**IDI rate is 2.12 m/sec.
***Weatherability using ASTM D 2565-85 conditions.

The addition of TP-95 to Polyblends A, B and C results in an increase in the Melt Index, which is directly related to a Polyblend's processability and an increase in the Polyblend's weatherability, as compared to the same Polyblend which does not contain TP-95. The addition of Loxiol G-70 (Example 3) results in a polyblend that is only half as weatherable as one containing TP-95 (see Example 2).

EXAMPLES 8 TO 13

In these examples, Polyblend A is compounded with various amounts of silicone and/or TP-95 and tested for IDI, weatherability and Izod impact strength. The results are reported in Table II below.

higher Izod impact and higher weatherability, as compared to those Polyblends where silicone alone or TP-95 alone is used. In addition, the Polyblend in Example 12 containing 2.0 pph TP-95 has better weatherability than that in Example 10 to which 0.2 pph silicone has been added or the control (Example 8) to which no additives have been added, notwithstanding the slight difference in the exposure levels (405 versus 450).

EXAMPLES 14 TO 16

In these examples, Polyblend D is compounded with TP-95 and TP-759 alternatively, and the resulting polyblends tested for weatherability. The results are tabulated in Table III below.

TABLE II

SUMMARY OF EXAMPLES 8 TO 13

| EXAMPLE | SILICONE (pph)* | TP-95 (pph) | IDI (Joules)** UNEXPOSED SAMPLE | WEATHERABILITY (% Retention)*** | MELT INDEX (g/10 minutes) |
|---|---|---|---|---|---|
| (8) Polyblend A | 0 | 0 | 16.9 | 47 at 450 | 140 |
| (9) Polyblend A | 0.05 | 0 | 17.6 | NT | 239 |
| (10) Polyblend A | 0.2 | 0 | 17.0 | 82 at 450 | 287 |
| (11) Polyblend A | 0.5 | 0 | 17.2 | NT | 291 |
| (12) Polyblend A | 0.2 | 2.0 | 15.8 | 113 at 405 | 373 |
| (13) Polyblend A | 0 | 2.0 | 15.6 | 112 at 405 | 144 |

NT = not tested
*pph = parts per hundred parts of Polyblend A.
**IDI rate is 3.39 m/sec.
***Weatherability using SAE J-1885 conditions.

TABLE III

SUMMARY OF EXAMPLES 14 TO 16

| EXAMPLE | TP-95 (pph)* | TP-759 (pph) | IDI (Joules) UNEXPOSED SAMPLE | WEATHERABILITY (% Retention)* |
|---|---|---|---|---|
| (14) Polyblend D | 0 | 0 | 16.0 | 50 at 450 |
| (15) Polyblend D | 5 | 0 | 15.7 | 101 at 450 |
| (16) Polyblend D | 0 | 5 | 16.3 | 92 at 450 |

*pph = parts per hundred of Polyblend D.
**IDI rate is 3.39 m/sec.
***Weatherability using SAE J-1885 conditions.

The results in Table II demonstrate that the addition of silicone alone (Examples 9, 10 and 11) provides in an increase in Izod impact and an increase in weatherability (Example 10), as compared to the Polyblend with no additives (Example 8). The addition of 2.0 pph TP-95 alone (Example 13) provides a Polyblend where the weatherability of the system more than doubles as compared to Example 8. When TP-95 and silicone are used in combination (Example 12), the Izod impact and weatherability increases as compared to the other Examples in Table II.

In conclusion, these results demonstrate that the addition of silicone and TP-95 provides a Polyblend with The results listed in Table III demonstrate that the addition of TP-95 or TP-759 at the 5.0 pph level provides improved weatherability over the control sample and that TP-95 is more effective.

The following comparative tests reported in Table IV and V were conducted to show the superiority of the TP-95 used in the present invention over the dioctyl adipate (DOA) used in the comparative examples in U.S. Pat. No. 4,877,826 of Beyer.

TABLE IV

SUMMARY OF COMPARATIVE RESULTS USING ASTM D2565 CONDITIONS AT 2000 KJ

| *EXAMPLE | PLASTICIZER (2%)** | IDI (Joule) UNEXPOSED | WEATHERABILITY (% IDI Retention) |
|---|---|---|---|
| 17 | None | 17.8 | 18.5 |
| 18 | DOA | 17.3 | 46.8 |
| 19 | TP-95 | 17.3 | 87.9 |

*All Examples were made using Polyblend A, which is described above, as the polymeric component.
**% is by weight based on the weight of Polyblend A.

The results show that Example 19 using TP-95 is superior to Sample 18 using DOA in IDI retention (87.9% to 46.8%) or an 88% improvement when using TP-95; (87.9 − 46.8 = 41.1 ÷ 46.8 = 87.8%).

TABLE V

| | SUMMARY OF COMPARATIVE RESULTS USING SAE-J 1885 CONDITIONS AT 600 kJ | | | |
|---|---|---|---|---|
| *EXAMPLE | PLASTICIZER (2%)** | IDI (JOULE) UNEXPOSED | WEATHERABILITY % IDI RETENTION | COLOR CHANGE db |
| 20 | None | 17.8 | 94.9 | 0.7 |
| 21 | DOA | 17.3 | 98.3 | 0.3 |
| 22 | TP-95 | 17.3 | 115.0 | 0.2 |

*All Examples were made using Polyblend A, which is described above, as the polymeric component.
**% is by weight based on the weight of Polyblend A.

The weathering test was carried out under SAE-J1885 conditions at 600 kJ. The color change, db, was measured CIE b value between 450 and 600 kJ exposures. A lower db number is more desirable whereas a higher number for % IDI retention is more desirable.

Comparing Examples 21 and 22, the results show that Sample 22 using TP-95 is superior to Example 21 using DOA in IDI retention (115.0% to 98.3%) and color change (0.2 to 0.3). The exposure time was about two (2) weeks. Longer exposure times would be expected to show even greater superiority for the TP-95 formulated polymer.

Having thus described the invention, what is claimed is:

1. A weatherable graft polymer composition comprising:
   (A) a graft polymer component comprising a rubber substrate selected from the group consisting of (i) mixtures of butyl acrylate rubbers and EPDM rubbers and (ii) mixtures of butyl acrylate rubbers and a diene rubber wherein the rubber substrate is grafted with a copolymer of a vinyl aromatic monomer and at least one copolymerizable monomer; and
   (B) a rigid copolymer component which is a copolymer of a vinyl aromatic monomer and at least one copolymerizable monomer; and
   (C) from 0.5 to 10 parts per hundred parts by weight of the graft polymer composition of one or more aliphatic diesters selected from the group consisting of dibutoxyethoxyethyl adipate or a mixture of dibutoxydiethoxyethyl adipate and dibutoxydiethoxyethyl glutarate.

2. The composition of claim 1 wherein from 1 to 5 parts of aliphatic diester are used.

3. The composition of claim 2 wherein a grafted diene rubber is used in combination with a grafted butyl arcylate rubber.

4. The composition of claim 2 wherein a grafted butyl acrylate rubber is used in combination with a grafted EPDM rubber.

5. The composition of claim 2 wherein the graft polymer component comprises a mixture of grafted butyl acrylate rubber and grafted EPDM rubber; and the diester is dibutoxyethoxyethyl adipate.

6. The composition of claim 2 wherein the graft polymer component comprises a mixture of grafted butyl acrylate rubber and grafted EDPM rubber; and the diester is a mixture of dibutoxydiethoxyethyl adipate and dibutoxydiethoxyethyl glutarate.

* * * * *